United States Patent [19]

Stevie

[11] Patent Number: 5,333,721
[45] Date of Patent: Aug. 2, 1994

[54] POUCH TRANSFER APPARATUS AND METHOD

[75] Inventor: John W. Stevie, Covington, Ky.

[73] Assignee: R. A. Jones & Co., Inc., Covington, Ky.

[21] Appl. No.: 969,716

[22] Filed: Oct. 29, 1992

[51] Int. Cl.⁵ .......................................... B65G 47/30
[52] U.S. Cl. ............................. 198/418.6; 198/463.2
[58] Field of Search ......................... 198/418.6, 463.2; 414/790.5, 790.6, 790.7, 790.8, 794.4

[56] References Cited

U.S. PATENT DOCUMENTS

| | | | |
|---|---|---|---|
| 3,093,233 | 6/1963 | Klenk | 198/463.2 X |
| 3,920,134 | 11/1975 | Scarpa et al. | 414/790.5 |
| 4,034,846 | 7/1977 | Burgis et al. | 414/790.7 X |
| 4,043,442 | 8/1977 | Greenwell et al. | |
| 4,124,128 | 11/1978 | Adams et al. | 414/790.6 X |
| 4,645,062 | 2/1987 | Kopp | 198/463.2 X |
| 4,984,677 | 1/1991 | Prakken | 198/418.6 |
| 5,191,963 | 3/1993 | Delsanto | 198/463.2 X |

Primary Examiner—D. Glenn Dayoan
Attorney, Agent, or Firm—Wood, Herron & Evans

[57] ABSTRACT

A transfer apparatus for transferring groups of shingled pouches from a pouch conveyor to the product buckets of a bucket conveyor. The shingled pouches are conveyed in groups on a pouch conveyor having an oscillating end. A drop box or accumulation chamber for accumulating the shingled pouches in stacks and then releasing the stacks at the appropriate time into the product buckets of the bucket conveyor is interposed at the discharge end of the pouch conveyor. The drop box is operatively interconnected with the oscillating end of the pouch conveyor and pouches are accumulated in stacked form therein. The drop box includes a drop gate that is opened in timed relation to the oscillating movements of the pouch conveyor as well as the linear movement of the bucket conveyor in order to release the stacks of pouches into the individual buckets of the bucket conveyor at the appropriate time. Pouch accumulation can occur during the return oscillation of the conveyor thus considerably shortening the necessary operating stroke of the pouch conveyor, and permitting increased bucket conveyor speeds. A pouch reject slide is preferably provided to selectively prevent undesirable pouches from entering the drop box.

29 Claims, 2 Drawing Sheets

POUCH TRANSFER APPARATUS AND METHOD

BACKGROUND OF THE INVENTION

The present invention generally relates to an apparatus for transferring pouches from a pouch conveyor into the product buckets of a cartoner. Specifically, the invention is an improvement of the transfer mechanism disclosed and claimed in U.S. Pat. No. 4,043,442 to Greenwell et al. ('442) which is assigned to the assignee of the present invention. U.S. Pat. No. 4,043,442 is fully and expressly incorporated by reference herein.

Both Greenwell '442 and the present invention are concerned with apparatus and process for transferring pouches from a form, fill and seal machine or poucher into the product buckets of a cartoner. Generally this was accomplished, by Greenwell, by oscillating ends of pouch conveyors back and forth laterally and intermittently feeding shingled groups of pouches into cartoner buckets moving constantly past the oscillating conveyor ends.

In the Greenwell '442 patent multiple lanes of pouches were fed onto a transfer apparatus which included a pair of slow conveyors at its upstream end and a pair of relatively faster conveyors at its downstream end. Respective slow and fast conveyors had overlapping portions and in that overlap location Greenwell et al. provided a check and release mechanism. The check and release mechanism not only provided an initial compacting of the shingled pouches but also held each shingled group momentarily until the associated fast conveyor had its upstream end raised to engage the shingled group to convey that group away from the check and release mechanism. The higher speed of the fast moving downstream conveyor effected the longitudinal separation of one group of shingled pouches from the next incoming group of shingled pouches on the adjacent conveyor. The overlapping conveyors provided assurance that the entire group of shingled pouches moved together when the fast conveyor was raised to engage them and carry them forwardly.

At the downstream end of the conveyor apparatus, Greenwell provided a second check and release mechanism. The second check and release mechanism stopped the oncoming group of shingled pouches until two side-by-side groups of shingled pouches were at the downstream end of the conveyor apparatus. When the two groups were assembled, the transfer mechanism was operated to swing alongside and in register with the product buckets and the check and release mechanism released the pouches. The fast moving conveyors then thrust or propelled the two groups of shingled pouches from the conveyors into the product buckets, one pouch in the shingled group following another. Immediately thereafter, the check and release mechanism returned to a check condition to capture the next group of shingled pouches. Because of the longitudinal spacing of the shingled pouch groups, imparted to them by the combined action of the slow and fast conveyors, there was a space interval between the incoming pouch groups which provided time for the check and release mechanism to operate.

The downstream check and release mechanism and the means for oscillating or swinging the conveyor apparatus were driven directly from the cartoner so that the release of the pouches was always in timed relationship to the movement of the bucket conveyor of the cartoner. Pouches were projected into buckets in momentary register with the oscillating ends of the conveyors. The pouch forming machine was also driven in timed relation to the bucket conveyor of the cartoner and the flow of pouches from the pouch forming machine coincided with the transfer of pouches into the product buckets of the bucket conveyor.

While the prior Greenwell apparatus provided a successful apparatus and process for loading shingled pouches into moving product buckets, packagers are now requiring increased speeds and cartoning efficiencies demanding faster bucket conveyor speeds. The Greenwell transfer or conveyor mechanism, and specifically the downstream check and release mechanism, has inherent limitations that prevent the use of such higher bucket conveyor speeds.

The downstream check and release mechanism disclosed in Greenwell '442, together with the serial ejection of pouches, necessitated a relatively long period of time to transfer the shingled groups of pouches from the end of the pouch conveyor into the product buckets. This period of time was directly related to the amount of time that it took the fast conveyor to discharge a shingled group of pouches, one pouch after another, into the product bucket. During the entire duration of the ejecting action, the end of the oscillating pouch conveyor had to be aligned or registered with a moving product bucket. The oscillating stroke length of the pouch conveyor was thus extended as a function of the time necessary to propel a shingle of pouches into the moving product bucket.

As used herein, the term "operating stroke" refers to that part of the oscillation cycle in which the free end or discharge end of the pouch conveyor is moving in registration with a particular product bucket of the bucket conveyor. The operating stroke therefore excludes those portions of the stroke in which the pouch conveyor is accelerating to reach the speed of the bucket conveyor, decelerating after release of the shingled pouches, and in reversing, accelerating, returning and decelerating to the beginning of the acceleration motion for in register ejection of pouches.

Also, the relatively long stroke of Greenwell's pouch conveyor caused the pouch conveyor to be at a proportionally large angle deviating from the perpendicular to the bucket conveyor as the shingled pouches were thrust or discharged into the product buckets, particularly at the beginning and end of the pouch ejection. This angular relationship has the capacity to cause misfeeding of pouches into buckets, particularly when operating at higher cartoning speeds. This, coupled with the inherent timing sensitivity of the downstream check and release mechanism, necessitated great accuracy in setting up and timing the transfer mechanism to run smoothly, and to insure that pouches were properly aligned in the product buckets.

Finally, Greenwell '442 provides no mechanism for rejecting single pouches or nonconforming groups of pouches between the pouch conveyor and the product buckets during the operation of the pouch conveyor. Thus, if undesirable pouches, pouch weights, pouch counts or the like were present on the pouch conveyor of Greenwell '442 either the entire operation was shut down in order to correct the problem, or the product buckets were improperly filled.

Accordingly, it has been one objective of the invention to provide an improved transfer apparatus for stacking pouches in product buckets where the buckets are moving at higher speeds than heretofore achieved.

It has been another objective of the invention to improve the efficiency of the process for transferring pouches from an oscillating conveyor to respective moving product buckets.

It has been still another objective of the invention to provide for rejections of undesirable pouches or pouch groups from a pouch conveyor prior to filling product buckets therefrom, and without interrupting the pouch transfer and bucket filling operation.

SUMMARY OF THE INVENTION

To these ends, a preferred embodiment of the present invention contemplates the interposition of an accumulation chamber or drop box between the discharge end of the pouch conveyor and the bucket conveyor. Preferably, the drop box is mounted at the end of the pouch conveyor and oscillates with it. The drop box mechanism or accumulation chamber establishes a pouch accumulation point between the oscillating end of the pouch conveyor and the product buckets where the pouches are not "shingled" but rather are stacked. The entire stack is dropped at once from this point into the moving product bucket. Since the pouches are dropped simultaneously into the bucket and not propelled one after the other from a "shingle", this substantially reduces the time needed to actually transfer pouches into the product buckets of the bucket conveyor. Stated in another way, once the pouches are stacked in the drop box, they can instantaneously be dropped into the product bucket moving momentarily in register with the oscillating drop box. Since the pouch stack is already formed and is dropped instantaneously as a single stack or unit, the duration of the drop is significantly shorter than the Greenwell seriatim projection of shingled pouches off the end of the conveyor. This minimizes the time and thus the operating stroke necessary to register the pouches with the respective product buckets. The pouch conveyor and associated drop box can thus be recycled more quickly, permitting an overall speed and efficiency increase in the loading of buckets.

The drop box or accumulation chamber allows the pouches to be stacked and held in place at any time during the cycle of the oscillating conveyor except when the drop gates open. In other words, pouches can be discharged from the conveyor to the drop box even during the return stroke when the conveyor discharge end is not aligned with a drop box. This was impossible with the earlier apparatus since such operations would have discharged the pouches when no bucket was in position to receive them. Thus the present invention provides for more efficient use of the entire oscillation cycle of the conveyor; filling on return stroke and dropping a whole stack simultaneously significantly shortens the time duration needed to fill the buckets and enables the bucket conveyor to operate at increased speeds.

Thus, while the transfer mechanism in Greenwell '442 required the oscillating conveyor to have a relatively large oscillating stroke to allow time for the shingled pouches to be discharged into the buckets after activation of the downstream check and release mechanism, the present invention requires a much shorter stroke since the stacked pouches now merely have to be dropped into the buckets and can be deposited into the drop box moving with the conveyor for a longer period during the cycle except during transfer, when the gates are open.

As noted, the drop box mechanism or accumulation chamber is preferably attached to an oscillating end of the pouch conveyor such that an entrance to the drop box is aligned with the end of the oscillating pouch conveyor and an exit or drop gate mechanism of the drop box is intermittently registrable with the openings of the product buckets moving along the bucket conveyor.

In the preferred embodiment of the invention the drop gate mechanism is formed by a linkage assembly which includes support arms extending down the sides of the drop box. These mount two bottom plates which move with the arms to open and close the drop box upon the activation of a double-acting cylinder that is operatively connected to the arms through operating links. The double-acting cylinder is controlled and operated in timed relation to the bucket conveyor so as to activate the drop gate when the drop box is in timed registration with a selected bucket moving along the bucket conveyor.

A reject slide mechanism selectively allows or prevents transfer of pouches from the pouch conveyor into the drop box. In a disengaged position, the reject slide mechanism resides above the shingled pouches and allows them to be transferred into the drop box in stacked form. In an engaged or lowered position, the reject slide receives pouches from the conveyor, directs them over and away from the drop box, and blocks selected pouches from entering the drop box. In the preferred embodiment, the reject slide is operated by a double-acting cylinder and may be activated manually or automatically through an upstream sensor control mechanism that senses when an incorrect number, arrangement or weight of pouches is traveling down the conveyor.

These and other features and objectives of the invention will become more readily apparent from the following detailed description taken in conjunction with the accompanying drawings.

GENERAL ORGANIZATION

Figure 1:
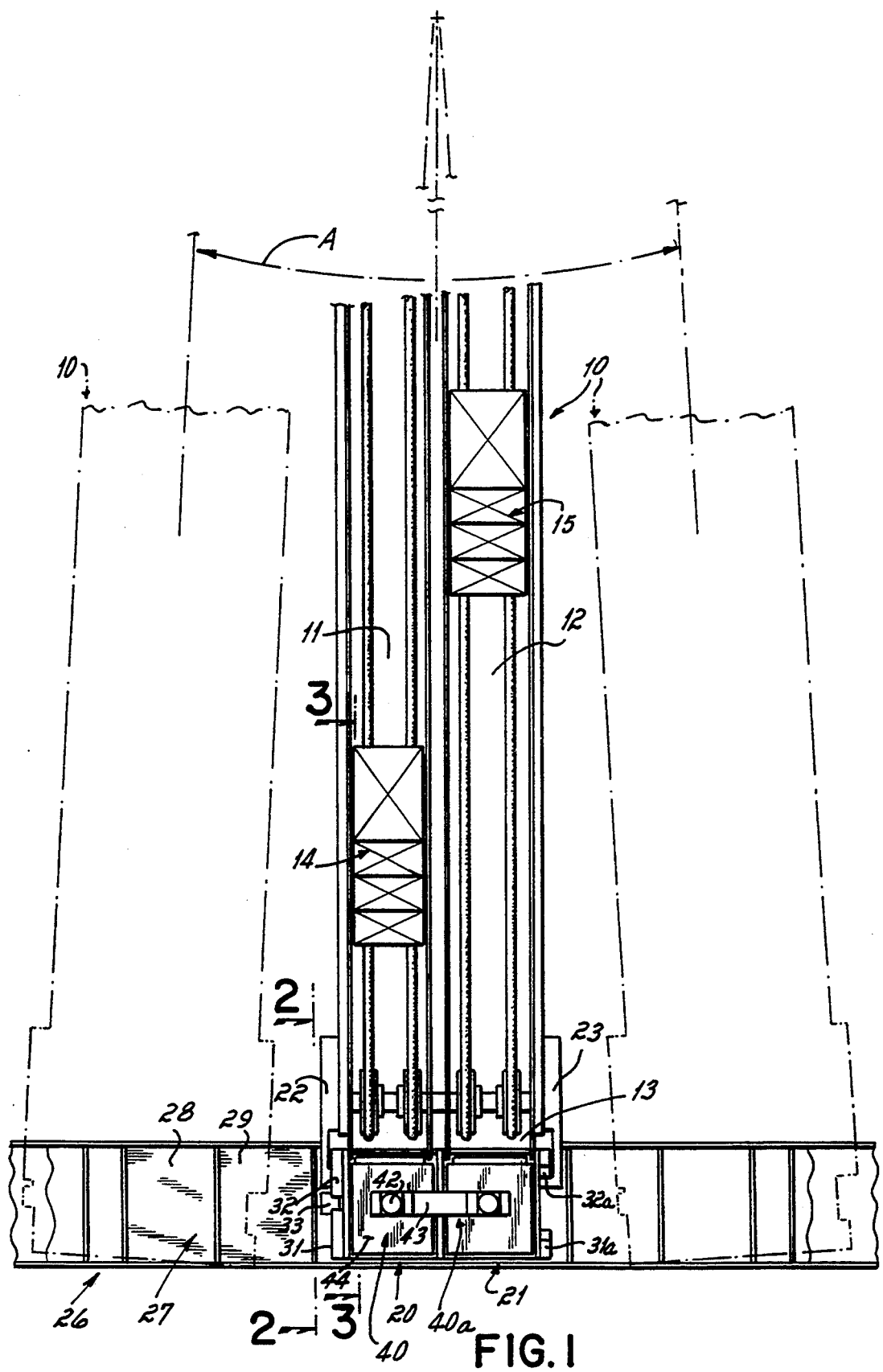
FIG. 1 is a diagrammatic plan view of the pouch conveyor and improved drop box mechanism of the apparatus.
Figure 3:
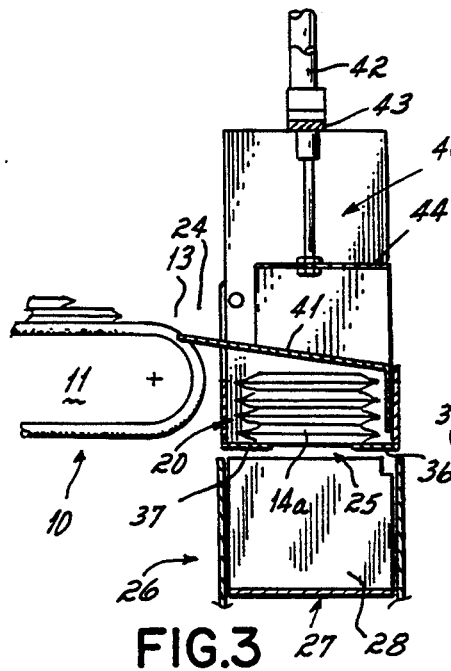
FIG. 3 is a cross sectional view of the drop box taken along lines of 3—3 of FIG. 1.
Figure 3A:
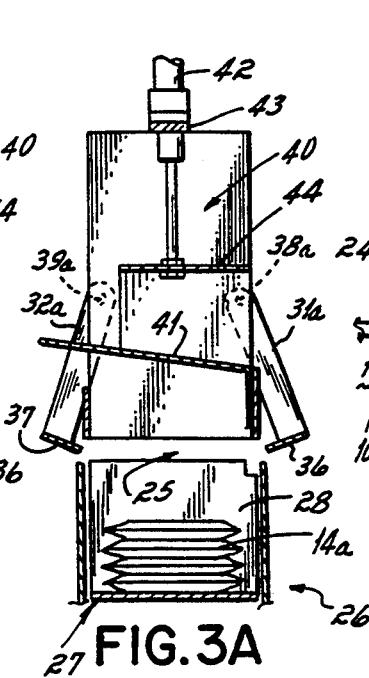
FIG. 3A in a view similar to FIG. 3, but showing the drop box gate in an open position for dropping pouches into a product bucket.
Figure 3B:
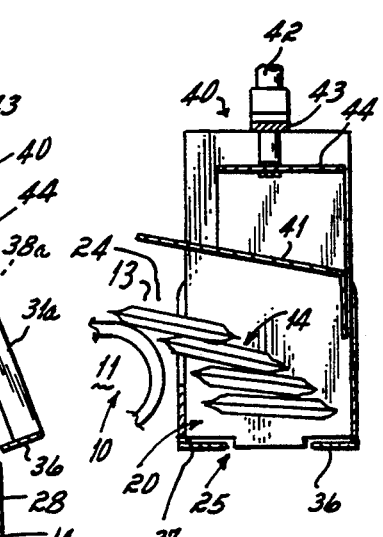
FIG. 3B is a view similar to FIG. 3 but showing the drop box in a closed position with shingled pouches entering the drop box.

As illustrated in FIG. 1, a two lane pouch conveyor 10 feeds shingled groups of pouches 14, 15 into two respective drop box mechanisms or accumulation chambers 20, 21 where the groups are accumulated in stacked form. As used herein for description, the term "shingled" refers to the form of the groups of pouches 14, 15 as shown on the pouch conveyor 10 in FIGS. 1 & 3. The term "stack" or "stacked" refers to the stacked form of the groups of pouches 14a, 15a in the respective drop boxes 20, 21 and in the product buckets 27, of a bucket conveyor 26, as shown in FIGS. 3 & 3A, respectively.

The discharge end of pouch conveyor 10 oscillates back and forth in the direction of arrow "A" to intermittently register with the product buckets 27 of a bucket conveyor 26. The pouch conveyor 10 in solid lines is in register with an underlying bucket 27 (not shown) while the phantom lines illustrate the conveyor 10 at the extreme ends of its oscillating cycle. These positions are shown over an exaggerated stroke distance for clarity; it will be appreciated the actual operating stroke provided by the invention is very small, such as 2.5' to 3'. During the period of registration, stacks of pouches are released from the drop box mechanisms or accumulation chambers 20, 21 into the individual compartments 28, 29 of the constantly moving product bucket 27.

In one use of the invention, the bucket conveyor 26 leads to a cartoner as shown in FIG. 1 of Greenwell '442. The bucket conveyor 26 used in conjunction with the pouch conveyor 10 of the present invention preferably has individual product buckets 27 each having two compartments 28, 29 with which are intermittently aligned the two drop units or accumulation chambers 20, 21.

The structure and operation of each pouch conveyor lane and drop box or accumulation chamber is essentially the same and, hence, only one will be described. It is to be understood that the invention is equally applicable to a system wherein a single pouch conveyor lane feeds pouches into a single drop box. Other combinations are, of course, possible with slight modification of the apparatus within the ability of the artisan of ordinary skill.

The Pouch Conveyor

Figure 2:
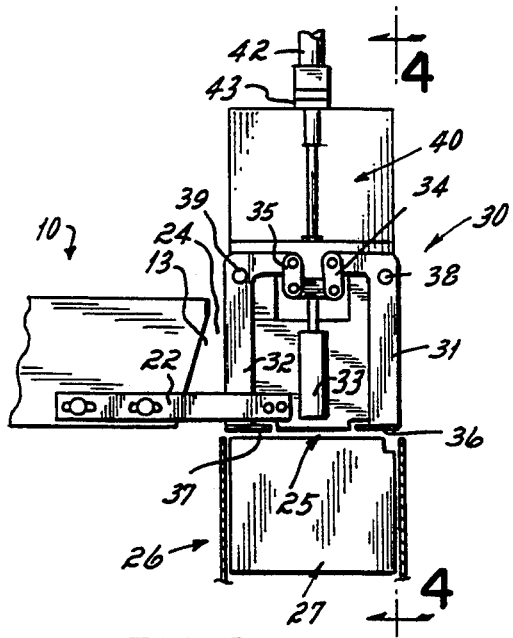
FIG. 2 is a front elevational view of the drop box mechanism and linkage assembly; taken along lines 2—2 of FIG. 1.

Referring first to FIG. 1, a pouch conveyor 10 is shown having two conveying lanes 11, 12. The two lane pouch conveyor 10 has a discharge end 13 and an infeed end (not shown). The infeed end is preferably constructed according to the infeed end shown in FIGS. 2 & 3 of Greenwell '442. This would include the provision of a "check and release mechanism 30" as shown in FIGS. 2 & 3 of Greenwell '442. This check and release mechanism provides for longitudinal separation of groups 14, 15 of shingled pouches traveling down the pouch conveyor.

In FIG. 1, the pouch conveyor 10 is shown to have an oscillating stroke which is provided by a drive mechanism, preferably of the same design as the drive mechanism shown in FIG. 6 of Greenwell '442. Of course, the drive mechanism shown in Greenwell '442 will require slight modification to accommodate the shorter stroke of the oscillating pouch conveyor 10 of the present invention. This would merely call for reducing the dimensions associated with the cam elements of the drive mechanism of Greenwell '442. These modifications are well within the mechanical ability of the artisan of ordinary skill. In addition, and due to the shortened stroke, this invention will also advantageously permit use of a simple and less expensive crank device in place of the cam.

Two drop box units or accumulation chambers 20, 21 are rigidly secured to the pouch conveyor 10 at discharge end 13 by means of support brackets 22, 23. The support brackets 22, 23 assure that the drop box units or accumulation chambers 20, 21 will be aligned with their respective conveyor lanes as the pouch conveyor oscillates through its cycle. Each lane 11, 12 of the pouch conveyor 10 supports and conveys respective shingled groups of pouches such as at 14, 15 which have been fed onto the pouch conveyor 10, for example, by a form, fill and seal machine as shown in FIG. 1 of Greenwell '442.

The Drop Box or Accumulation Chamber

Referring to FIGS. 2, 3, and 3A, a drop box or accumulation chamber 20 is shown generally having an inlet area or entrance at 24 and a discharge or exit end 25. The entrance 24 is aligned with the discharge end 13 of the oscillating pouch conveyor 10. The drop box 20 is rigidly attached to the discharge end 13 of the pouch conveyor by a support bracket 22 such that it is disposed over the conveyor run of the bucket conveyor 26, and the product buckets 27.

The drop box 20 serves as an accumulation point for shingled groups of pouches 14 which are discharged from lane 11 into the entrance 24 for stacking within the drop box 20 and for release at the appropriate time through the exit end 25. It will be appreciated that since the accumulation chamber or drop box 20 is attached to conveyor 10, and acts as an accumulation point or queuing station for the stacks of pouches, the shingled group pouch 15 can enter the accumulation chamber at any time during the oscillation cycle except, of course, when the drop gates are open.

As is further shown in FIG. 2, the accumulation chambers 20 and 21 have a discharge or drop gate 30 for opening and closing their exits 25. The drop gate 30 includes a linkage assembly having two parallel links 34, 35 attached to a double acting cylinder 33 which is secured to the drop box 20. The linkage assembly further comprises two pivoting arms 31, 32 pivotally attached to the drop box 20 by pivotal fasteners 38, 39 and to the parallel links 34, 35. The two arms 31, 32 carry at their opposite ends respective bottom plates 36, 37.

Figure 4:
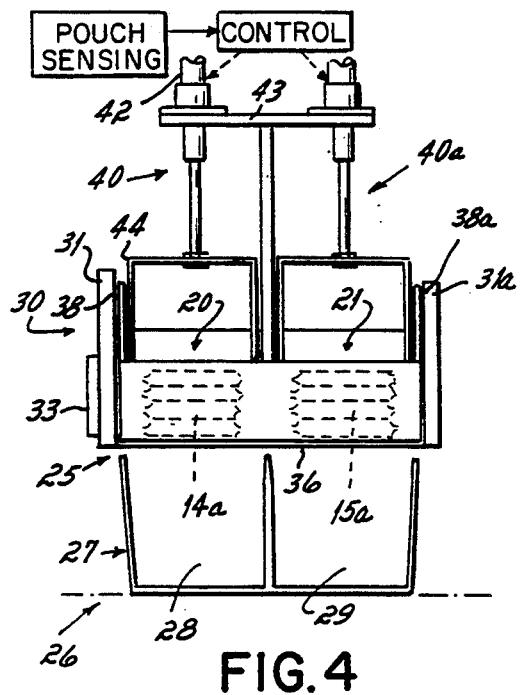
FIG. 4 is a side elevational view of the drop box showing two drop box units at the discharge end of the pouch conveyor, taken along lines 4—4 of FIG. 1.

Referring to FIG. 4, the bottom plates 36, 37 preferably extend across two drop boxes or accumulation chambers 20, 21 and are supported on the other drop box 21 by two further pivoting arms 31a, 32a. The two arms 31a, 32a are attached to the drop box 21 by pivotal fasteners 38a, 39a.

The two bottom plate members 36, 37 support a respective stacks of pouches 14a, 15a in each drop box 20, 21. The bottom plates 36, 37 are opened and closed in response to the retraction and extension of the double-acting cylinder 33. Only one double-acting cylinder is necessary to simultaneously release the pouches from both drop boxes 20, 21.

The double-acting cylinder 33 is operated with, for example, a suitable solenoid valve (not shown). The solenoid valve may be controlled by any well-known control means that activates the valve during the time that the accumulation chambers 20, 21 are moving in registration with, i.e., at approximately the same speed and location as, a product bucket 27 of the bucket conveyor 26. A simple timing control system such as this is well within the ability of the artisan of ordinary skill and need not be explained further here. Moreover, a cam or other device could be used in place of the double acting cylinder to actuate the drop gates.

FIG. 4 shows the transfer mechanism during that part of the oscillation cycle where the accumulation chambers 20, 21 are moving in registration with the individual compartments 28, 29 of the product bucket 27. As shown in FIG. 4, the stacks of pouches 14a, 15a are in position to be dropped into the individual compartments 28, 29 during this period of registered movement.

Pouch Reject Apparatus

A pouch reject apparatus 40 comprises a reject slide 41 attached to a support or chute 44 which is in turn coupled with a double-acting cylinder 42. The double-acting cylinder 42 is attached to a suitable support member 43 which is secured to the drop box 20. As described below, the double-acting cylinder 42 may be manually or automatically activated. As with the double-acting cylinder 33, activation of the double-acting cylinder 42 may be controlled by a suitable solenoid valve which is operated by any appropriate controller, marked "Control" in FIG. 4 in response to any suitable signal from a sensor, marked "Pouch Sensing" in FIG. 4. Shown in its engaged or lowered position in FIG. 3, the pouch reject mechanism 40 prevents any pouches from entering the drop box 20. This is accomplished by interposing the slide 41 at the discharge end 13 of lane 12 over the drop box and thus closing off the entrance 24 to the drop box 20. Rejected pouches slide down the slide 41 (off to the right as viewed in FIG. 3) and into a suitable collection area (not shown). They are not deposited into the drop box.

The pouch reject apparatus serves three purposes. First, the reject apparatus 40 may be used upon start-up of the transfer mechanism to clear the pouch conveyor 10 of any pouches which may exist on the conveyor at start up, but which, for one reason or another, would not reach the product buckets 27 in the proper number or arrangement. In other words, the use of the reject mechanism 40 during start-up clears the transfer mechanism of pouches until the correct numbers and arrangements of shingled pouches 15 are moving down the pouch conveyor 10 in timed relation to the moving bucket conveyor 26.

Second, the pouch reject apparatus 40 can be operated via a manual switch (not shown). In this instance, the operator would activate the manual switch if he or she noticed an incorrect arrangement or number of pouches traveling down the pouch conveyor 10. Through manual activation the operator would avoid having to stop the entire system due to an isolated problem.

Third, the pouch reject apparatus 40 may also be operated automatically. Automatic control of the pouch reject apparatus 40 would serve two functions. First, the pouch reject 40 would be automatically engaged when an upstream sensor means, e.g., an optical sensor arrangement (not shown), indicates that an incorrect number or arrangement of pouches is traveling down the pouch conveyor 10. Second, the pouch reject mechanism 40 may be automatically engaged in a manner that is timed to the pouch filling operation of the drop box 20. That is, once the drop box 20 is filled with a stack of pouches 14a, the reject mechanism 40 would immediately engage to assure that no additional pouches enter the drop box 20 during that particular oscillation cycle. This particular use of the pouch reject 40 is illustrated in FIG. 3. The pouch reject 40 is automatically raised or disengaged, after the pouches have been released from the drop box 20, to allow the next group of pouches to enter the drop box 20.

Of course, a similar pouch reject apparatus 40a (FIG. 4) is used with lane 11 and drop box 21, and can be operated simultaneously with, and independently of reject apparatus 40. Accordingly, the pouch stacking in each respective drop box 20, 21 is respectively controlled.

Operation

In the operation of the preferred embodiment of the invention, the drop boxes 20 and 21 are designed to receive, stacks 14a and 15a of pouches. Four pouches are shown in each but more or less pouches can be in each shingled group and stack. During the oscillation cycle, the drop boxes or accumulation chambers 20, 21 intermittently register with respective individual compartments 28, 29 of a product bucket 27 and release the stacks of pouches during that part of the oscillation cycle in which the drop box units 20, 21 are moving at approximately the same speed as the product bucket 27. As previously mentioned, the oscillating pouch conveyor 10 is preferably driven from the bucket conveyor through a cam mechanism as shown in Greenwell '442. This drive mechanism allows for intermittent registration between the accumulation chambers 20, 21 and the individual compartments 28, 29 of the product bucket 27 during the oscillation stroke when the pouch conveyor 10 is moving at approximately the same speed as the bucket conveyor 26.

While the foregoing operation has been described in connection with a single oscillating pouch conveyor 10, as is shown in Greenwell '442, the oscillating pouch conveyor 10 is preferably coupled with a second oscillating pouch conveyor such that two product buckets may be filled simultaneously with a total of twenty pouches, for example, during the operation of the apparatus.

As previously mentioned, the present invention significantly reduces the length of the oscillating pouch conveyor's stroke and the actual time needed to transfer a group of shingled pouches from the discharge end of the pouch conveyor into a product bucket. The transfer is now made 2–4 times faster as compared to the Greenwell '442 transfer time.

By way of example, the operating stroke of the twin oscillating pouch conveyors of Greenwell '442, (with each conveyor operating at 650 pouches/minute and each conveyor transferring 10 pouches (5 pouches per lane) per cycle) is 6.5'(minimum) and 9.1'(maximum). The operating stroke required by the transfer apparatus of the present invention operating under the same conditions is only 2.6'($\pm$0.52'). As a result, the time required to make the transfer of 20 pouches into two product buckets has been improved from approximately 0.25–0.35 seconds using the Greenwell '442 transfer mechanism to approximately 0.08–0.12 seconds using the improved transfer mechanism of the present invention. The time saved due to both the reduced operating stroke and the ability to fill the drop box accumulation chamber with pouches on the return stroke allows greater bucket conveyor speed which in turn permits increased speed in the entire packaging operation.

Accordingly, the invention provides higher bucket conveyor speeds, more efficient transfer of shingled pouches into stacked form and into a bucket conveyor and less operator intervention and resulting machine downtime.

In an alternative embodiment, the accumulation or drop box can be separated from the pouch conveyor 10 and oscillated past a non-oscillating pouch conveyor. This would still present timing concerns at the conveyor/accumulator interface, but may still achieve the desired load cycle with respect to product buckets fed by the accumulator.

Moreover, it will be appreciated that the invention is useful to handle large groups of pouches or articles or smaller groups of pouches or articles, such as groups of two. Indeed, the invention could be used, if desired, to handle the transfer of single pouches on a conveyor into a moving product bucket.

These and other objectives and advantages will become readily apparent to one of ordinary skill in the art without departing from the scope of the invention, and applicant, intends to be bound only by the claims appended hereto.

I claim:

1. In a transfer apparatus for transferring pouches into a bucket conveyor, said transfer apparatus having at least one pouch conveyor for conveying pouches toward a bucket conveyor and oscillating between return strokes and operating strokes in intermittent registration with respective buckets of said bucket conveyor for introducing pouches into said buckets, wherein the improvement comprises:

accumulation means operationally disposed at the downstream end of said pouch conveyor for receiving pouches discharged from said conveyor, accumulating pouches from said pouch conveyor in stacked form, and for intermittently dropping formed stacks of pouches into registered buckets of said bucket conveyor.

2. The transfer apparatus of claim 1 wherein said accumulation means is operatively interconnected with said pouch conveyor for receiving shingled pouches from said pouch conveyor and stacking said pouches therein, said accumulation means having a discharge gate means having a closed position for supporting pouches collected in said accumulation means and an open position for dropping stacks of said pouches into a predetermined, registered bucket of the bucket conveyor.

3. The transfer apparatus of claim 2 wherein the accumulation means comprises an accumulation chamber and said discharge gate means comprises a drop gate comprising bottom plate means mounted on a support and operating linkage means attached to said accumulation chamber for opening and closing said accumulation chamber.

4. The transfer apparatus as in claim 3 including wherein a drop gate activation means operatively connected to said linkage means for moving said bottom plate into said open and closed positions.

5. The transfer apparatus of claim 4 wherein said drop gate activation means comprises at least one double-acting cylinder.

6. The transfer apparatus of claim 3 wherein said linkage means further comprises a plurality of gate support arms movably mounted on said accumulation chamber and supporting said bottom plate means.

7. The transfer apparatus of claim 6 wherein said bottom plate means comprises two bottom plates.

8. The transfer apparatus as in claim 1 wherein said accumulation means further comprises pouch reject means for preventing pouches from entering said accumulation means.

9. The transfer apparatus as in claim 8 wherein said pouch reject means comprises a reject slide and being movable between an engaged position wherein pouches discharging from said pouch conveyor are prevented from entering said accumulation means, and a disengaged position wherein pouches are free to move from said pouch conveyor into said accumulation means.

10. The transfer apparatus as in claim 9 further comprising slide activation means for moving said reject slide between said engaged and disengaged positions.

11. The transfer apparatus as in claim 10 wherein said slide activation means comprises at least one double-acting cylinder.

12. The transfer apparatus as in claim 1 wherein said conveyor has a discharge end oscillating back and forth in a forward stroke and a return stroke, and wherein said conveyor is operable to discharge pouches into said accumulation means during said return stroke.

13. The transfer apparatus of claim 1 including at least two pouch conveyor lanes oscillating together, each pouch conveyor having an accumulation means operationally disposed at its downstream end.

14. The transfer apparatus of claim 1 wherein said pouch conveyor is operable to convey pouches at a speed of about 650 pouches per minute and wherein said pouch conveyor has a discharge end having an operating stroke of approximately 2.6 inches, said accumulation means further comprising means for dropping said stacks of pouches from said accumulation means into a product bucket in approximately 0.08–0.12 seconds.

15. Apparatus as in claim 1 wherein said pouch conveyor is operable to introduce pouches into said accumulation means during return strokes of said pouch conveyor.

16. Apparatus as in claim 1 wherein said pouch conveyor is operable to introduce pouches into said accumulation means during times when said accumulation means is operable to accumulate pouches therein.

17. Apparatus as in claim 1 wherein said pouch conveyor has an oscillating pouch discharge end, wherein said accumulation means oscillates with said discharge end, and wherein said pouch conveyor is operated to discharge pouches from said conveyor into said accumulation means when neither said discharge end nor said accumulation means is in deposit register with a bucket.

18. Apparatus for transferring pouches from a conveyor into moving product buckets comprising:

a pouch conveyor for conveying a pouch to a discharge position;

a pouch dropping means movable in register with said discharge position for receiving a pouch discharged from said pouch conveyor;

means for oscillating said pouch dropping means into operative register with a moving product bucket; and, said pouch dropping means including apparatus for dropping a pouch therein into said moving product bucket when in operative register therewith, wherein said pouch dropping means oscillates from said operative register position, with respect to a product bucket, through a return stroke, and said apparatus further includes means for discharging said pouch into said pouch dropping means during said return stroke.

19. A method of transferring groups of shingled pouches from a pouch conveyor into the product buckets of a bucket conveyor and comprising the steps of:

(a) conveying shingled pouches in a group to a discharge end of the pouch conveyor;

(b) transferring said group of pouches into an accumulation chamber;

(c) forming a stack of pouches from said group in said accumulation chamber;

(d) oscillating the accumulation chamber to create intermittent registration between the accumulation chamber and the product buckets of the bucket conveyor; and (e) discharging the group of stacked pouches from the accumulation chamber into a product bucket of the bucket conveyor during a period of registration between the accumulation chamber and the product bucket.

20. The method of claim 19 wherein the accumulation chamber further comprises a drop gate having activation means for moving said drop gate between an open and closed position, and the discharging step further comprises the step of:

discharging said stacked pouches from said accumulation chamber into the product bucket by moving said drop gate to an open position with said activation means.

21. The method of claim 19 including the step of intermittently interposing a pouch reject slide between the pouch conveyor and accumulation chamber to prevent accumulation of undesirable pouches in the accumulation chamber by directing pouches away from said accumulation chamber.

22. The method of claim 21 including the further steps of:

(a) sensing the condition of upstream pouches; and (b) selectively operating said pouch reject slide in response to said sensing to prevent accumulation of pouches in said accumulation chamber.

23. A method of transferring groups of shingled pouches from a first conveyor having an oscillating discharge end onto respectively predetermined locations on a second conveyor in stacked form comprising the steps of:

(a) discharging shingled pouches from said first conveyor discharge end;

(b) receiving shingled pouches from said first conveyor and accumulating said shingled pouches into a vertical stack with pouches one on top of another; and (c) intermittently dropping accumulated stacks of pouches onto predetermined locations on said second conveyor.

24. A method of transferring groups of shingled pouches from a first conveyor onto a second conveyor wherein said first conveyor has a discharge end oscillating in intermittent registration with predetermined pouch receiving locations on said second conveyor, said method comprising the steps of:

(a) receiving pouches from said first conveyor;

(b) accumulating said pouches into a stack;

(c) oscillating said conveyor and said stack with an operating stroke of oscillation in timed registered movement with a predetermined pouch location on said second conveyor; and, (d) dropping said stack onto said second conveyor during said period of registered movement.

25. A method as in claim 24 wherein said accumulating step is carried out during a return stroke of oscillation opposite to said operating stroke.

26. A method of transferring pouches from one pouch conveyor having an end oscillating in operating and opposite direction return strokes to another conveyor moving in a single direction, said method comprising the steps of:

discharging a group of pouches from a discharge end of said one pouch conveyor;

receiving said pouches in stacked form in an accumulation means oscillating with said discharge end; and dropping a stack of accumulated pouches from said accumulation means onto a predetermined location of said other conveyor during an operating stroke of said pouch conveyor when said accumulation means is momentarily in predetermined register with said predetermined location.

27. A method as in claim 26 including the further step of receiving pouches in said accumulation means in stacked form during said return stroke.

28. A method of transferring pouches from a conveyor having a pouch dropping means which oscillates through an operating stroke and a return stroke into moving product buckets, the method comprising the steps of:

conveying at least one pouch along said conveyor;

discharging said pouch into said pouch dropping means during said return stroke;

synchronizing said pouch dropping means with a moving product bucket during said operating stroke; and, dropping said pouch from said pouch dropping means into said moving product bucket when said pouch dropping means is in operative register therewith.

29. A method as in claim 28 wherein said conveying, discharging and dropping steps are carried out with a group of pouches.

* * * * *

UNITED STATES PATENT AND TRADEMARK OFFICE
CERTIFICATE OF CORRECTION

PATENT NO. : 5,333,721
DATED : August 2, 1994
INVENTOR(S) : John W. Stevie

It is certified that error appears in the above-indentified patent and that said Letters Patent is hereby corrected as shown below:

Column 5, line 15, 2.5' to 3' should be -- 2.5" to 3" --.

Column 8, line 45, 6.5' should be -- 6.5" --.

Column 8, line 45, 9.1' should be -- 9.1" --.

Column 8, line 48, 2.6' ($\pm$0.52') should be -- 2.6" ($\pm$0.52") --.

Signed and Sealed this

Twenty-first Day of March, 1995

*Attest:*

BRUCE LEHMAN

*Attesting Officer*     *Commissioner of Patents and Trademarks*